United States Patent
Katayama

(10) Patent No.: US 6,914,419 B2
(45) Date of Patent: Jul. 5, 2005

(54) POWER SUPPLY SYSTEM AND METHOD THEREOF

(75) Inventor: Yasushi Katayama, Nagano (JP)

(73) Assignee: Fuji Electric Co., Ltd. (JP)

(*) Notice: Subject to any disclaimer, the term of this patent is extended or adjusted under 35 U.S.C. 154(b) by 113 days.

(21) Appl. No.: 10/658,669

(22) Filed: Sep. 9, 2003

(65) Prior Publication Data
US 2004/0124817 A1 Jul. 1, 2004

(30) Foreign Application Priority Data
Sep. 13, 2002 (JP) .......................... 2002-267988

(51) Int. Cl.[7] .............................. G05F 1/613
(52) U.S. Cl. .............. 323/225; 323/284; 323/299; 323/351
(58) Field of Search ............................ 323/222, 224, 323/225, 283, 284, 285, 299, 301, 351

(56) References Cited

U.S. PATENT DOCUMENTS 6,396,252 B1 * 5/2002 Culpepper et al. ......... 323/285
6,833,691 B2 * 12/2004 Chapuis .................... 323/225
6,853,169 B2 * 2/2005 Burstein et al. ............ 323/225

FOREIGN PATENT DOCUMENTS

JP    2001-211640 A    8/2001

OTHER PUBLICATIONS

U.S. Appl. No. 10/797,627, filed Mar. 10, 2004, Kobayashi.

* cited by examiner

Primary Examiner—Jessica Han
(74) Attorney, Agent, or Firm—Rossi, Kimms & McDowell, LLP

(57) ABSTRACT

A power supply system prevents the output voltage from dropping during the changeover of the power source from a series regulator to a DC-DC converter. The power supply system has two types of power sources, a DC-DC converter and a series regulator that are connected parallel to each other. The first switching element of the DC-DC converter transfers the input voltage to the load. The second switching element connects the load to the ground. The control circuit turns ON and OFF the first and second switching elements on receipt of a first selection signal so that the number of turn-ONs of the second switching element gradually increases. This suppresses the current from flowing backward through the second switching element SW2 to the ground while the power source is changing over, preventing drop in the output voltage.

6 Claims, 8 Drawing Sheets

POWER SUPPLY SYSTEM AND METHOD THEREOF

BACKGROUND

A power supply mounted on an electronic apparatus steps down an external voltage to a level appropriate for the electronic circuit in the apparatus. Power efficiency of some of such power supplies varies depending on the loading condition of the output terminal of the power supply. For example, a DC-DC converter that steps down the voltage by means of PWM control exhibits low power efficiency when the loading is light and high power efficiency when the loading is heavy. This is due to driving losses generated at the ON-OFF operation of semiconductor switches in the DC-DC converter. On the other hand, a series regulator performs at constant power efficiency independently of the loading.

There are known power supply systems that exchange a power source between a DC-DC converter and a series regulator corresponding to the loading, as disclosed in Japanese Unexamined Patent Application Publication No. H11-341797 and No. 2002-112457. When the load connected to the power supply system is light, the series regulator steps down the voltage. When the load connected to the power supply system is heavy, as the power efficiency of a DC-DC converter is higher than the power efficiency of the series regulator, the DC-DC converter steps down the voltage. This type of a power supply system is mounted, for example, on an electronic apparatus that operates in a waiting mode and a normal operating mode. In the waiting mode, the number of driven circuits are small, making the loading light so that the series regulator can step down the voltage. In the normal operating mode, a larger number of circuits are driven, increasing the loading so that the DC-DC converter can step down the voltage.

FIG. 6 shows a circuit diagram of a conventional power supply system. The power supply system of FIG. 6 comprises a DC-DC converter 40 and a series regulator 50 connected parallel to the DC-DC converter 40. Output terminals of the DC-DC converter 40 and the series regulator 50 connect to a capacitor C3 and a load 60. The DC-DC converter 40 operates upon receipt of an enable signal EN1. The series regulator 50 operates upon receipt of an enable signal EN2. The enable signals EN1 or EN2 is fed to the DC-DC converter 40 or the series regulator 50 depending on the loading condition of the load 60. When the load 60 is light, the enable signal EN2 is fed to the series regulator 50. When the load 60 becomes heavy and the power efficiency of the DC-DC converter exceeds the power efficiency of the series regulator 50, the enable signal EN1 is fed to the DC-DC converter 40.

The DC-DC converter 40 comprises a PWM control circuit 41, drivers Z3 and Z4, transistors Q3 and Q4, diodes D3 and D4, and an inductor L3. The DC-DC converter 40 is a synchronous step-down DC-DC converter. In the synchronous rectification system, the diode used as a rectifying element in the conventional system that would be disposed at the position of the transistor Q4 is replaced by a transistor Q4, which has lower ON-resistance. The transistors Q3 and Q4 complementarily turn ON and OFF, and control the output voltage by a duty cycle of the transistor Q3. Conduction losses can be reduced by using the transistor Q4 with low ON-resistance in place of a diode. The PWM control circuit 41 receives a feed back voltage at a terminal of the inductor L3 and outputs switching signals OUT1 and OUT2 that are pulse-width-modulated in response to the feed back voltage. The drivers Z3 and Z4 drive the transistors Q3 and Q4 in response to the switching signals OUT1 and OUT2 output from the PWM control circuit 41. The transistor Q3 is an N-channel MOS transistor. When a switching signal OUT1 at a high level, that is, in an 'H' state, is fed to the gate, the transistor Q3 turns on between the source and the drain thereof, and transfers the input voltage Vin to the inductor L3. A parasitic diode D3 of the transistor Q3 is connected between the source and the drain of the transistor Q3. The transistor Q4 is an N-channel MOS transistor. When a switching signal OUT2 at an 'H' state is fed to the gate, the transistor Q4 turns ON between the source and the drain thereof, and connects the inductor L3 to the ground. A parasitic diode D4 of the transistor Q4 is connected between the source and the drain of the transistor Q4.

FIG. 7 is a timing chart showing an enable signal fed to the PWM control circuit and output signals output from the PWM control circuit. The PWM control circuit 41 outputs switching signals OUT1 and OUT2 upon transition of the enable signal EN1 from the 'L' state to the 'H' state, as shown in FIG. 7. The switching signals OUT1 and OUT2 are output in 'H' state complementarily. The PWM control circuit 41 outputs switching signals OUT1 and OUT2 intervening a dead time td between 'H' states of the switching signals OUT1 and OUT2 in order to prevent the transistors Q3 and Q4 from simultaneously turning ON between the source and the drain of the transistors. The ON-period duty cycle D of the DC-DC converter is represented by the equation (1) below independently of output current.

$$D = Vout/Vin \quad (1)$$

When power supply operation is switched from the series regulator to the DC-DC converter, if an initial ON-period duty cycle DO immediately after the power source changeover is smaller than the on-period duty cycle D represented by the equation (1), a period of excessive ON-time of the transistor Q4 is generated during the interval of transition from the initial ON-period duty cycle DO to the ON-period duty cycle D due to delay of the PWM control circuit 41. Accordingly, immediately after changing the power source, the current originating from the charges stored in the capacitor C3 flows back from the capacitor C3 through the inductor L3 and the transistor Q4 to the ground. As a result, the output voltage Vout from the DC-DC converter 40 temporarily decreases significantly. FIG. 8 is a timing chart showing output voltage from the power supply system and enable signals fed to the power supply system. As shown in the FIG. 8, at the time t1, enable signal EN1 is changed from 'L' state to 'H' state and enable signal EN2 is changed from 'H' state to 'L' state, to changeover the power source from the series regulator 50 to the DC-DC converter 40. The output voltage Vout from the DC-DC converter 40 temporarily decreases significantly, as illustrated in FIG. 8.

As described above, the problem with the conventional power supply system is that when the power source is changed over from the series regulator 50 to the DC-DC converter 40, the ON-period of the transistor Q4 becomes excessively large, causing a backward current flow through the transistor Q4 to the ground, resulting in drop in the output voltage. Accordingly, there is a need for a power supply system that prevents the output voltage from dropping during the power source changeover from the series regulator to the DC-DC converter. The present invention addresses this need.

SUMMARY OF THE INVENTION

The present invention relates to a power supply system in particular, to a power supply system that outputs a voltage to a load by changing over a power source between a DC-DC converter and a series regulator, and a method thereof.

One aspect of the present invention is a power supply system for outputting a voltage to a load by changing power sources. The power supply system of the invention includes a DC-DC converter and a series regulator. The DC-DC converter includes a first switching element that transfers input voltage to the load, a second switching element that connects the load to a ground, and a control circuit that turns ON and OFF the first switching element and the second switching element with a first selection signal without overlapping ON-periods of the first switching element and the second switching element so that the second switching element turns ON m times in a stepping period during which the first switching element turns ON n times, wherein n is a predetermined integer, and m is an integer between any of zero and n that increases in every stepping period. The series regulator outputs a voltage to the load with a second selection signal.

The control circuit receives step signals with gradually increasing pulse widths and gradually increases the number m of turn ONs of the second switching element in each of the stepping periods. The pulse width increases in the every stepping period by a specified increment step. The first selection signal is fed to the DC-DC converter and the second selection signal is fed to the series regulator corresponding to the loading condition of the load. The first selection signal and the second selection signal are mutually exclusive and are not simultaneously fed to the control circuit.

Another aspect of the present invention is a method of controlling the power supply system. The method includes outputting a voltage to the load by inputting the first signal to the control circuit thereof to turn ON and OFF the first and second switching elements without overlapping ON-periods of the first and second switching elements, and turning ON the second switching element m times in a stepping period during which the first switching element turns ON n times, wherein n is a predetermined integer, and m is an integer between any of zero and n that increases in every stepping period. The method further includes outputting a voltage to the load by inputting the second selection signal to the series regulator.

DETAILED DESCRIPTION

Figure 1:
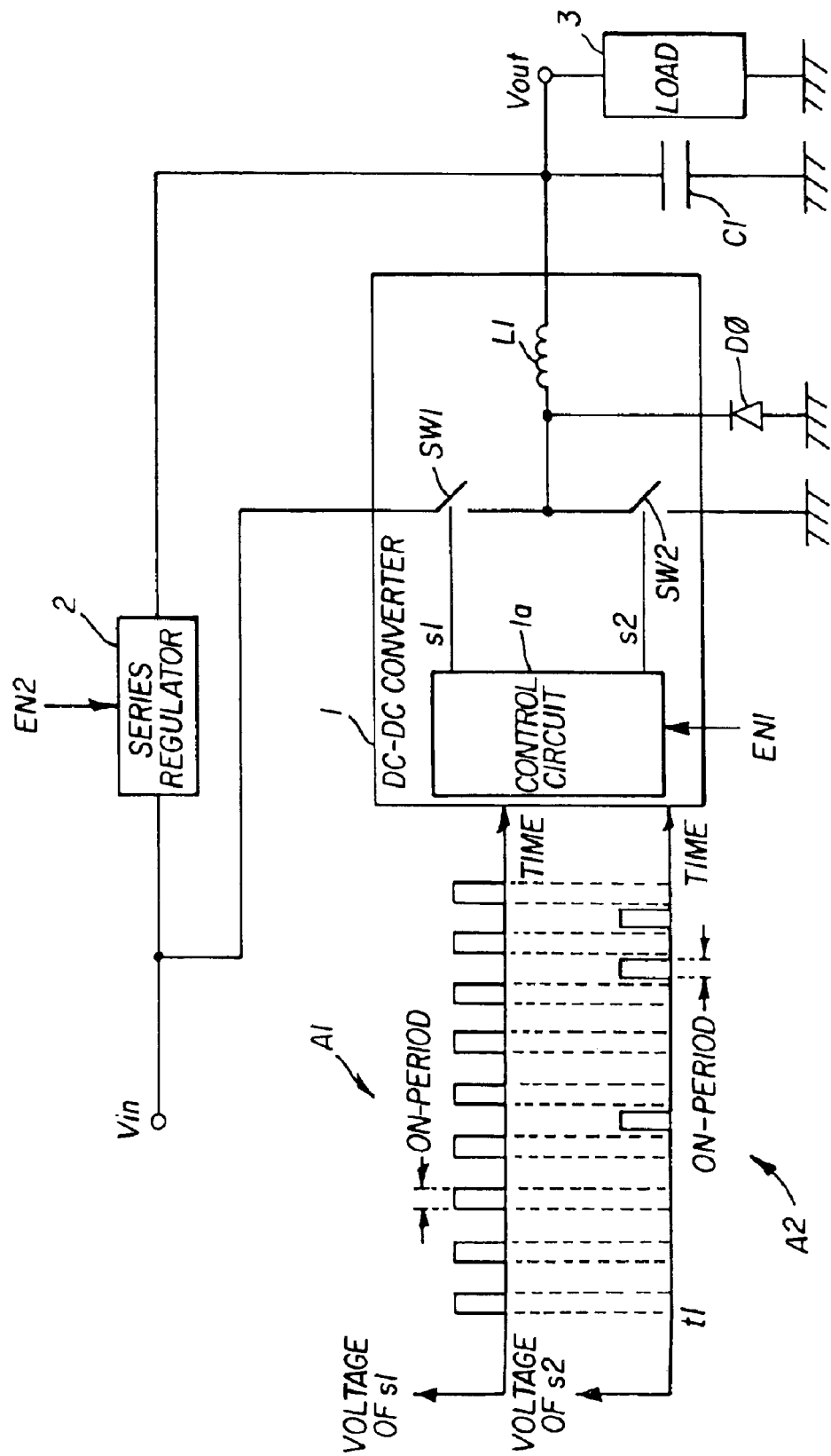
FIG. 1 shows a principle of a power supply system according to the present invention.

FIG. 1 shows a principle of a power supply system according to the present invention. The power supply system comprises a DC-DC converter 1 and a series regulator 2. The DC-DC converter 1 includes a control circuit 1a, switching elements SW1 and SW2, a free wheeling diode D0, and an inductor L1. The FIG. 1 also shows voltage waveforms A1 and A2 of switching signals s1 and s2 that are output from the control circuit 1a. The DC-DC converter 1 and the series regulator 2 are connected parallel to each other. Output terminals of the DC-DC converter 1 and the series regulator 2 connect to a capacitor C1 and a load 3. The DC-DC converter 1 steps down the input voltage Vin and outputs to the load 3 when a first selection signal EN1 is input thereto. The series regulator 2 steps down the input voltage Vin and outputs to the load 3 when a second selection signal EN2 is input thereto.

The first selection signal EN1 or the second selection signal EN2 is input to the DC-DC converter 1 or the series regulator 2 depending on the loading condition of the load 3. When the loading is light, the second selection signal EN2 is input to the series regulator 2. When the loading is heavy and the power efficiency of the DC-DC converter 1 exceeds the power efficiency of the series regulator 2, the first selection signal EN1 is input to the DC-DC converter 1. Thus, the two selection signals EN1 and EN2 are not simultaneously input to the two types of power sources.

The control circuit 1a, upon receipt of the first selection signal EN1, outputs switching signals s1 and s2 that turn ON and OFF the switching elements SW1 and SW2. The control circuit 1a here outputs the switching signal s2 such that the number of turn-ON of the switching element SW2 gradually increases. First selection signal EN1 is fed to the DC-DC converter at a time t1. The control circuit 1a outputs the switching signals s1 that has the voltage waveforms A1 and turns ON and OFF the switching elements SW1. The control circuit 1a outputs the switching signal s2 having the voltage waveform A2 and gradually increases the number of turn-ON of the switching element SW2. The switching element SW1 connects and disconnects the input voltage Vin to the load 3 according to the switching signal s1 output from the control circuit 1a. The switching element SW2 connects and disconnects the load 3 to the ground according to the switching signal s2 output from the control circuit 1a. The free wheeling diode D0 allows holding of the current in the inductor L1 when both the switching elements SW1 and SW2 are in an OFF-state. The resistance of the diode D0 is, however, higher than the ON-resistance of the switching element SW2. The inductor L1 makes smooth the ON-OFF of the input voltage Vin generated by ON-OFF operation of the switching element SW1. The capacitor C1 smoothes the output voltage Vout output from the DC-DC converter 1.

The operation of the power supply system is described below. When the load 3 changes from light to heavy, a first selection signal EN1 is fed to the DC-DC converter to changeover the power source from the series regulator 2 to the DC-DC converter 1. The control circuit 1a outputs the switching signals s1 and s2 to turn the switching elements SW1 and SW2 ON and OFF as shown in the voltage waveforms A1 and A2. The switching signal s2 from the control circuit 1a gradually increases the number of turn-ONs of the switching element SW2 as shown by the voltage waveform A2. When the power source is changed over from the series regulator 2 to the DC-DC converter 1, the number of turn-ONs of the switching element SW2 (that is proportional to average time interval) for connecting the load 3 to the ground gradually increases. Accordingly, the backward current originating from the charges in the capacitor C1 is suppressed from flowing from the capacitor C1 through the inductor L1 and the switching element SW2, to restrain the drop of the output voltage Vout supplied to the load 3.

Figure 2:
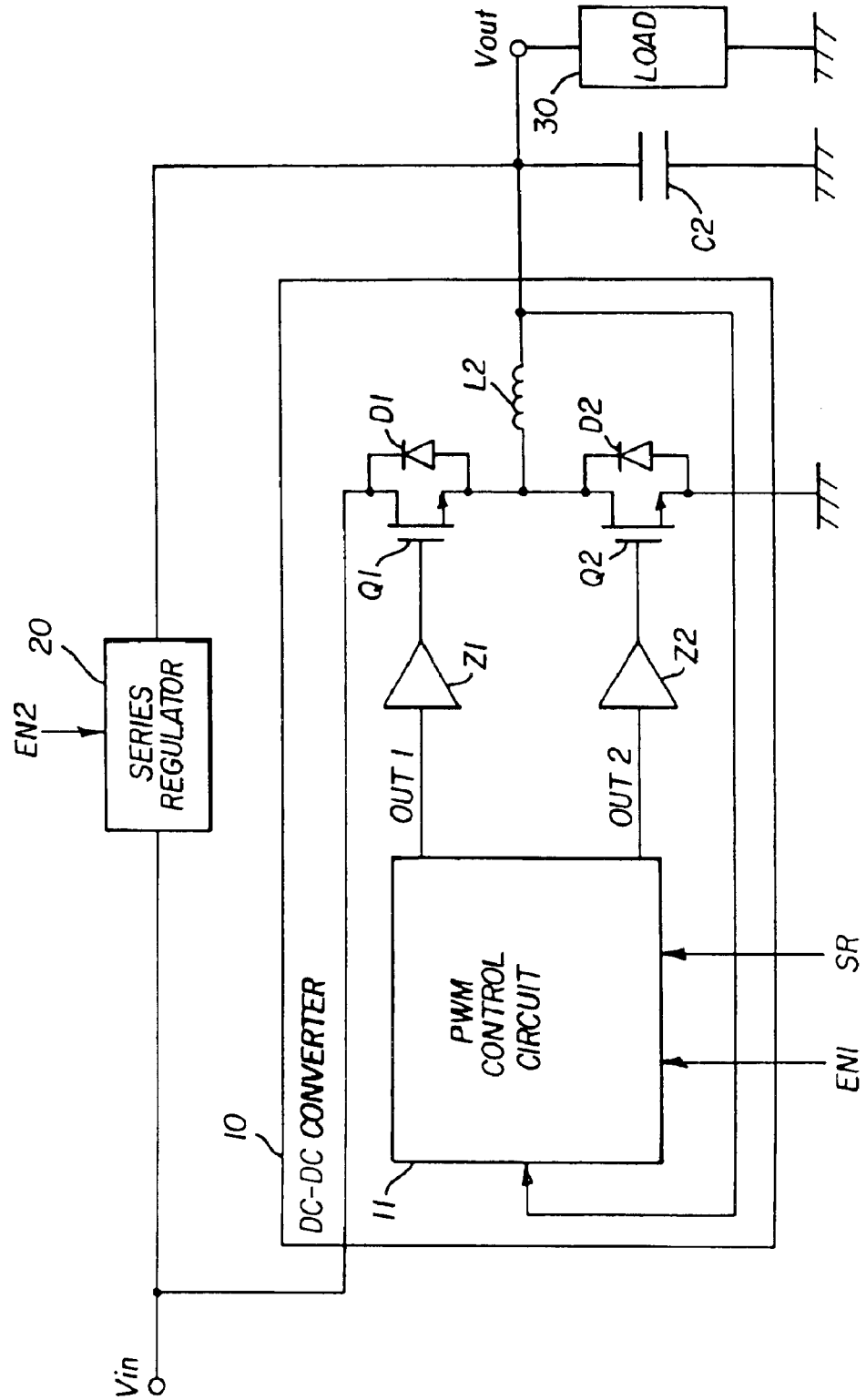
FIG. 2 is a circuit diagram of a power supply system of an embodiment according to the present invention.

FIG. 2 is a circuit diagram of a power supply system of an embodiment of the present invention. Here, the power supply system comprises two types of power sources: a DC-DC converter 10 and a series regulator 20. The DC-DC converter 10 and the series regulator 20 are connected parallel to each other. The output stages of the power sources connect to a capacitor C2 and a load 30. The DC-DC converter 10 steps down an input voltage Vin and outputs an output voltage Vout to the load 30 upon receipt of an enable signal EN1. The series regulator 20 steps down the input voltage Vin and outputs the output voltage Vout to the load 30 upon receipt of an enable signal EN2. The enable signal EN1 or EN2 is fed to the DC-DC converter 10 or the series regulator 20 corresponding to the loading of the load 30. When the loading on the load 30 is light, the enable signal EN2 is fed to the series regulator 20, which operates with higher power efficiency in a light loading condition. When the loading on the load 30 changes from light to heavy, the enable signal EN1 is fed to the DC-DC converter, which works with high power efficiency in a heavy loading condition.

The DC-DC converter 10 steps down the input voltage by means of synchronous rectification system. The DC-DC converter 10 comprises a PWM control circuit 11, drivers Z1 and Z2, transistors Q1 and Q2, diodes D1 and D2, and an inductor L2. The PWM control circuit 11 outputs switching signals OUT1 and OUT2 for switching ON and OFF the transistors Q1 and Q2 upon receipt of the enable signal EN1. The PWN control circuit 11 receives a feedback voltage from one terminal of an inductor L2, another terminal of which is connected to a joint between the transistor Q1 and the transistor Q2. Pulse-width-modulated switching signals OUT1 and OUT2 are generated according to this feedback voltage. The internally generated switching signal OUT1 is output as an output signal OUT1 from the PWM control circuit 11 in the as generated form.

Figure 3:
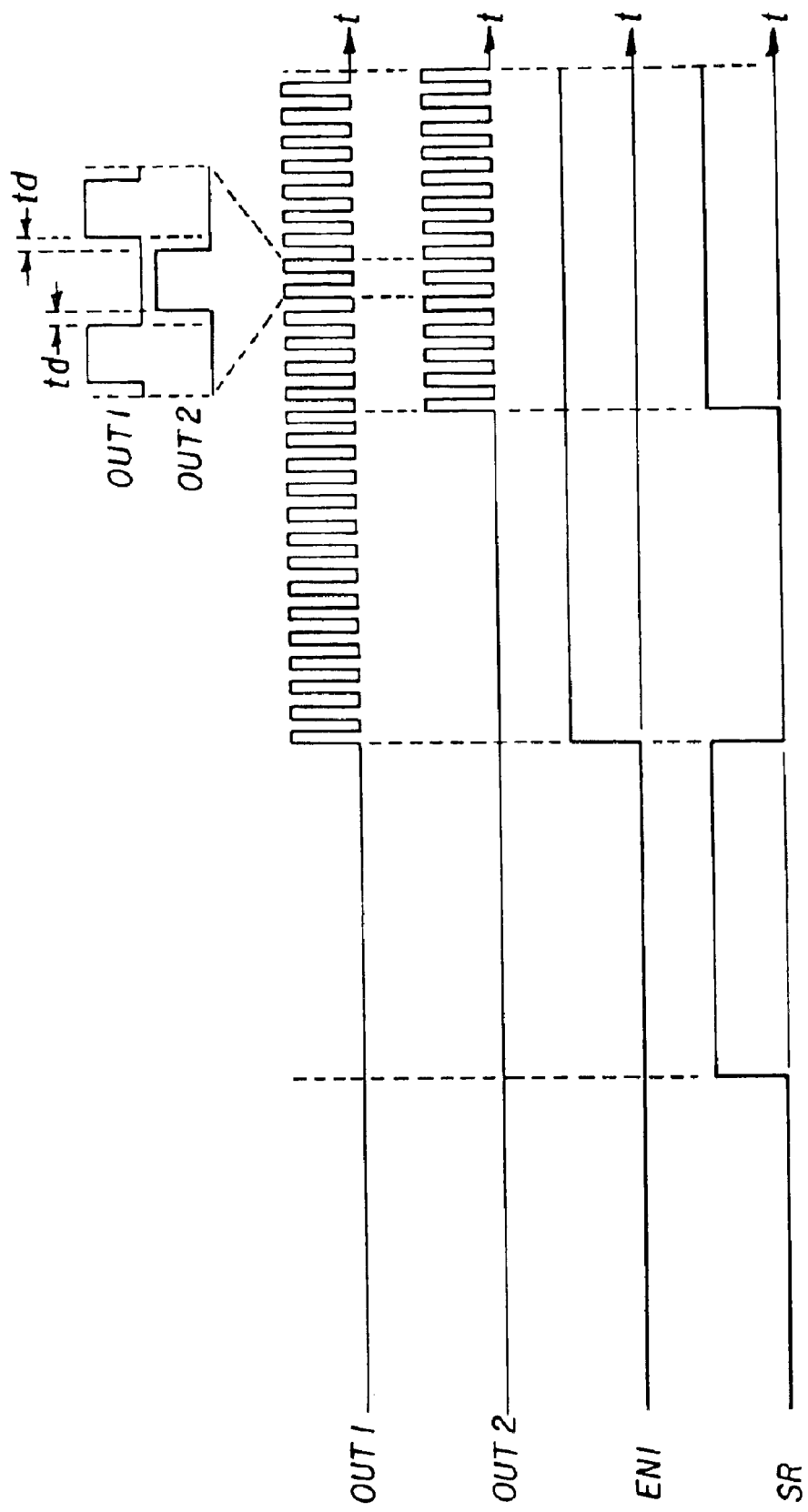
FIG. 3 is a timing chart illustrating relations among the step signal and an enable signal that are fed to the PWM control circuit, and the switching signals that are output from the PWM control circuit.

A step signal SR is input to the PWM control circuit 11. When the step signal SR is 'H', the internally generated switching signal OUT2 is output as an output signal OUT2 from the PWM control circuit 11 in the as generated form. When the step signal SR is 'L', the internally generated switching signal OUT2 is masked (or inhibited) by the step signal SR in the 'L' state, and the output of the switching signal OUT2 from the PWM control circuit 11 consistently has the value 'L'. FIG. 3 is a timing chart illustrating relations among the step signal and the enable signal that are fed to the PWM control circuit, and the switching signals that are output from the PWM control circuit. Actual operational sequence concerning the SR signal will be described later. As shown in FIG. 3, the PWM control circuit outputs the switching signal OUT1 for switching ON and OFF the transistor Q1 on receiving the enable signal EN1. The PWM control circuit outputs the switching signal OUT2 for switching ON and OFF the transistor Q2 on receiving the enable signal EN1 and besides, receiving the step signal SR. That is, the PWM control circuit 11 outputs the switching signal OUT1 on receiving the enable signal EN1, and outputs the switching signal OUT2 on additionally receiving the step signal SR.

The PWM control circuit 11, in ordinary operation, outputs switching signals OUT1 and OUT2 to turn the transistors Q1 and Q2 ON alternately. The PWM control circuit 11 outputs the switching signals OUT1 and OUT2 inserting a dead time td for eliminating overlapping of 'H' states in the OUT1 and the OUT2 to prevent the transistors Q1 and Q2 from simultaneously turning ON between the source and the drain of the transistors. The PWM control circuit 11 outputs the switching signal OUT2 in response to the input period, or 'H' state period, of the step signal SR fed to the PWM control circuit. Pulse width of the step signal SR increases after every predetermined stepping period by a specified increment step to gradually increase the duration of ON-period of the transistor Q2.

Figure 4:
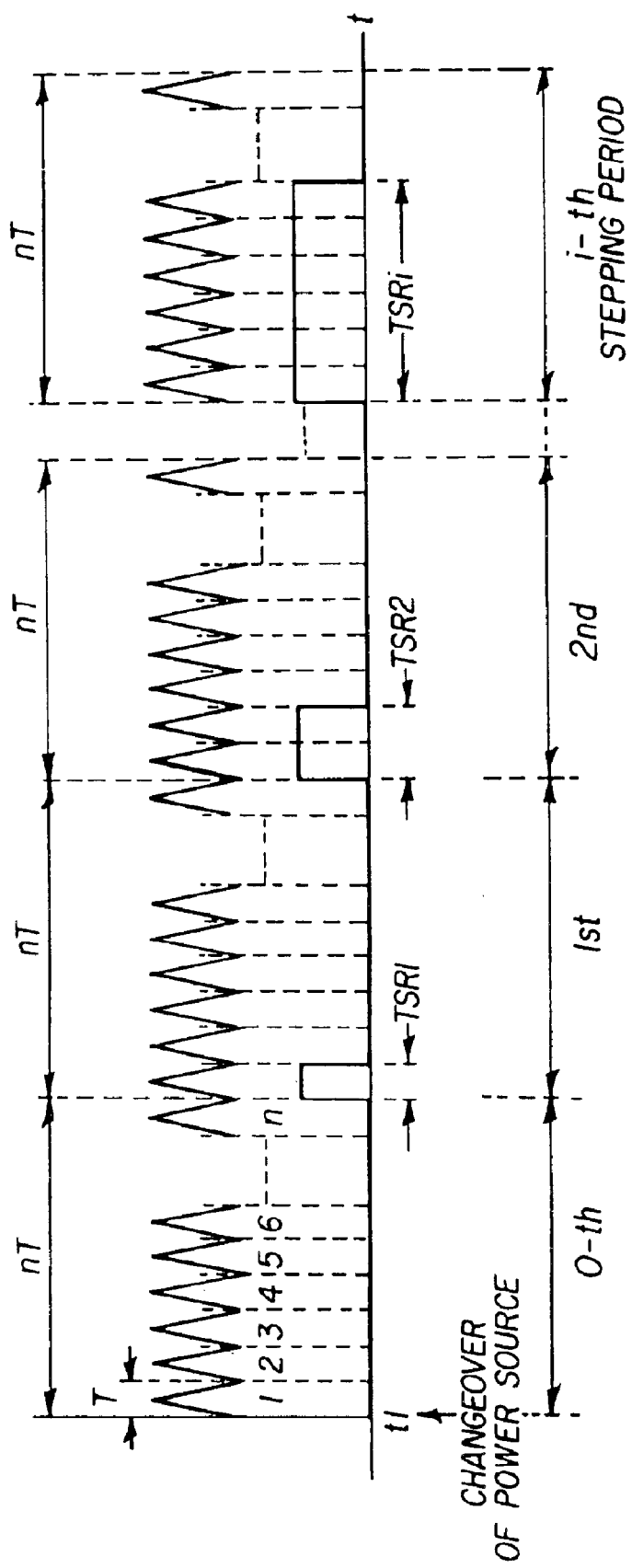
FIG. 4 is a timing chart of the step signal fed to the PWM control circuit.

FIG. 4 shows a timing chart of the step signal fed to the PWM control circuit. As shown in FIG. 4, n cycles of switching cycles T are assembled to a block. A pulse width of the pulse signal SR in the i-th block is denoted as TSRi. The TSRi equals mT, where m is an integer between any of zero to n. When a power source is switched from the series regulator 20 to the DC-DC converter 10 at the time t1, the step signal SR is in an 'L' state in the 0-th block. In the blocks afterwards, pulse widths of the step signals gradually increase so that TSRi+1>TSRi. The PWM control circuit 11 receives the step signal having pulse widths that increase after every predetermined stepping period by a specified increment step. In response to this step signal SR, the PWM control circuit 11 outputs the switching signal OUT2 to gradually increase the number of turn-ON of the transistor Q2. The drivers Z1 and Z2 drive the transistors Q1 and Q2 in accordance with the switching signals OUT1 and OUT2.

Transistor Q1 is an N-channel MOS transistor. The transistor Q1 turns ON between the source and the drain upon receipt of the switching signal OUT1 at the 'H' state on the gate thereof, and transfers the input voltage Vin to the inductor L2. A parasitic diode D1 of the transistor Q1 is connected parallel to the source and the drain of the transistor Q1. Transistor Q2 is an N-channel MOS transistor. The transistor Q2 turns ON between the source and the drain upon receipt of the switching signal OUT2 in the 'H' state on the gate thereof, and connects to the ground. A parasitic diode D2 of the transistor Q2 is connected parallel to the source and drain of the transistor Q2. The inductor L2 is connected to the source of the transistor Q1 and the drain of the transistor Q2, and also connected to the capacitor C2 and the load 30. Operation of the power supply system of FIG. 2 is described below using a timing chart.

Figure 5:
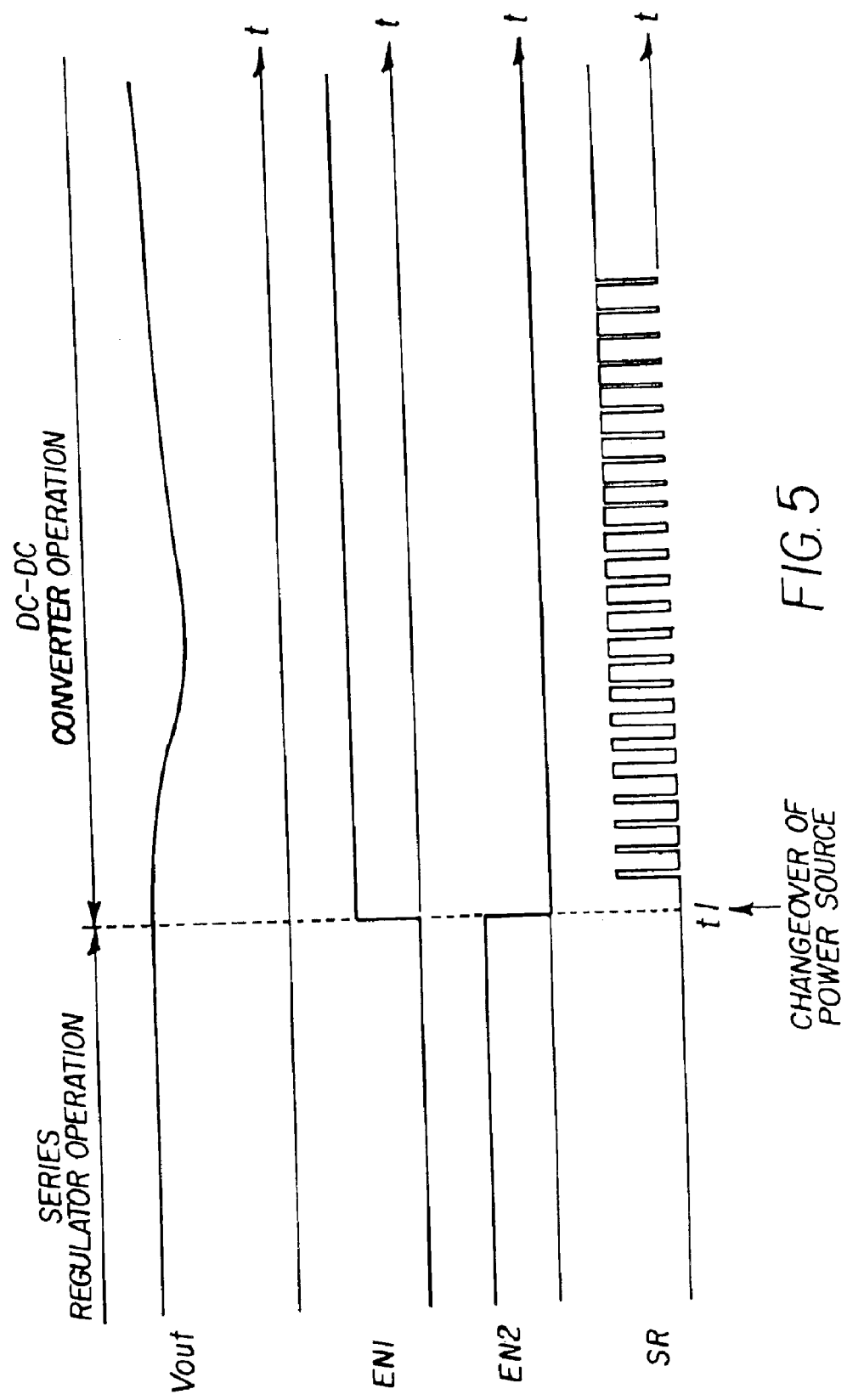
FIG. 5 is a timing chart of an output voltage from the power supply system, and input signals of enable signals and a step signal fed to the power supply system.
Figure 6:
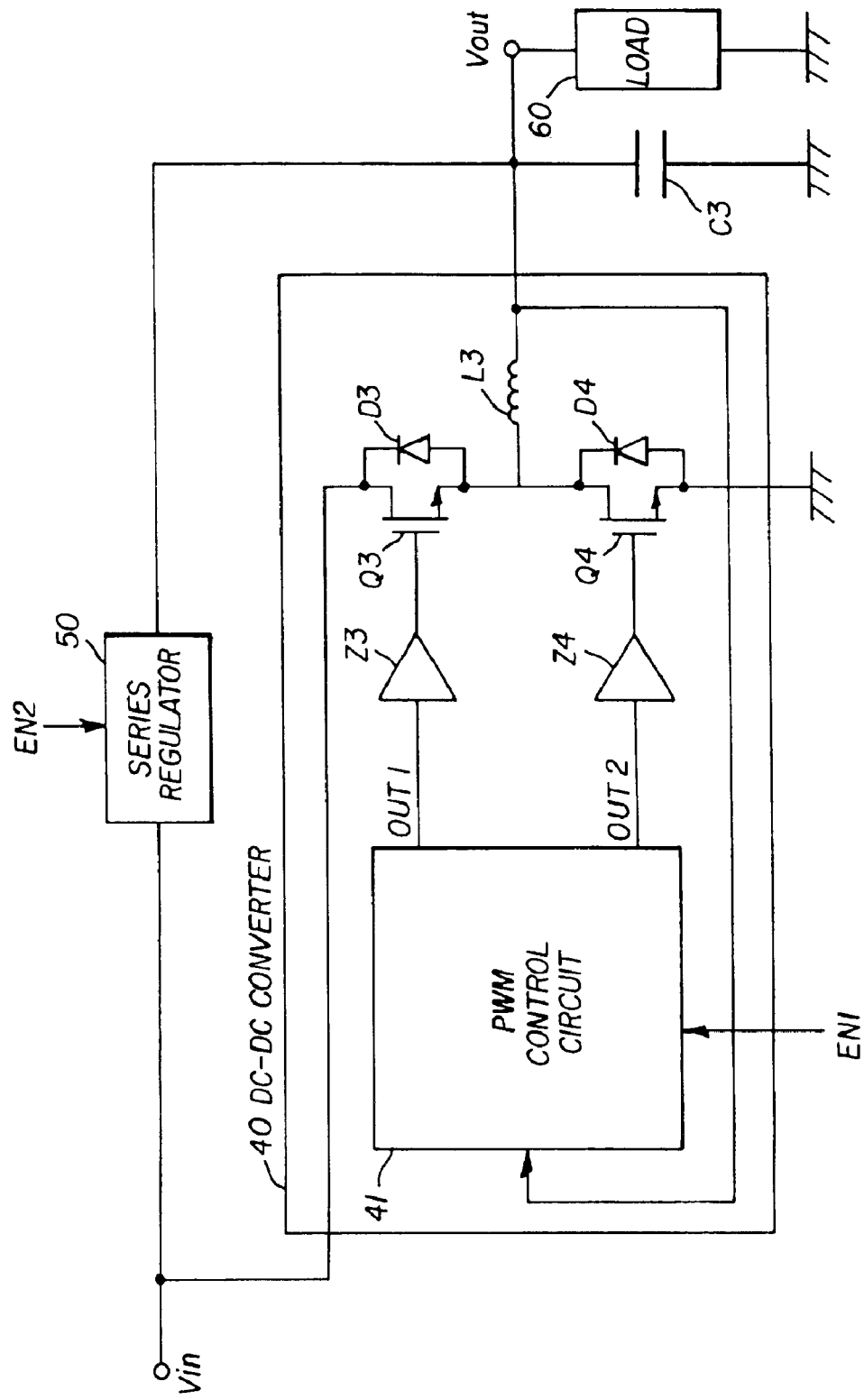
FIG. 6 is a circuit diagram of a conventional power supply system.
Figure 7:
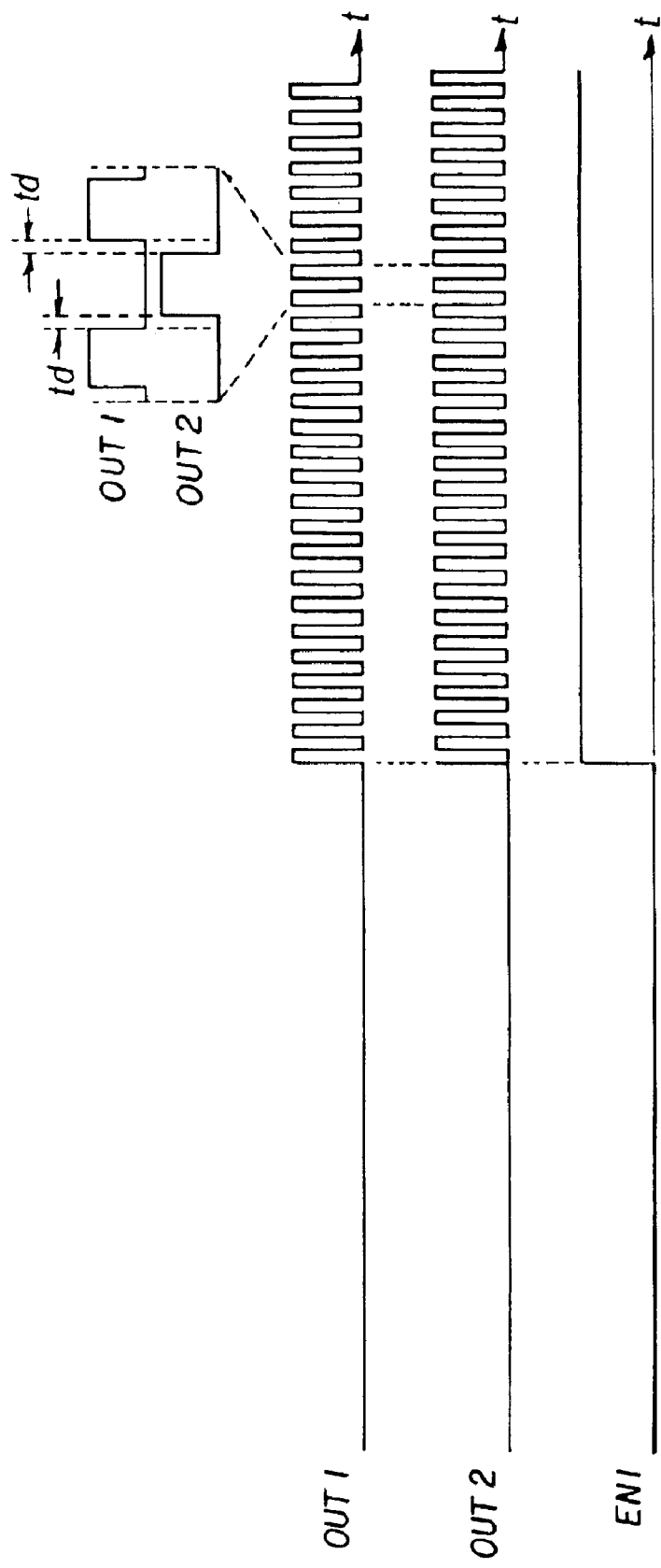
FIG. 7 is a timing chart illustrating an enable signal fed to a PWM control circuit and output signals output from the PWM control circuit of a conventional power supply system.
Figure 8:
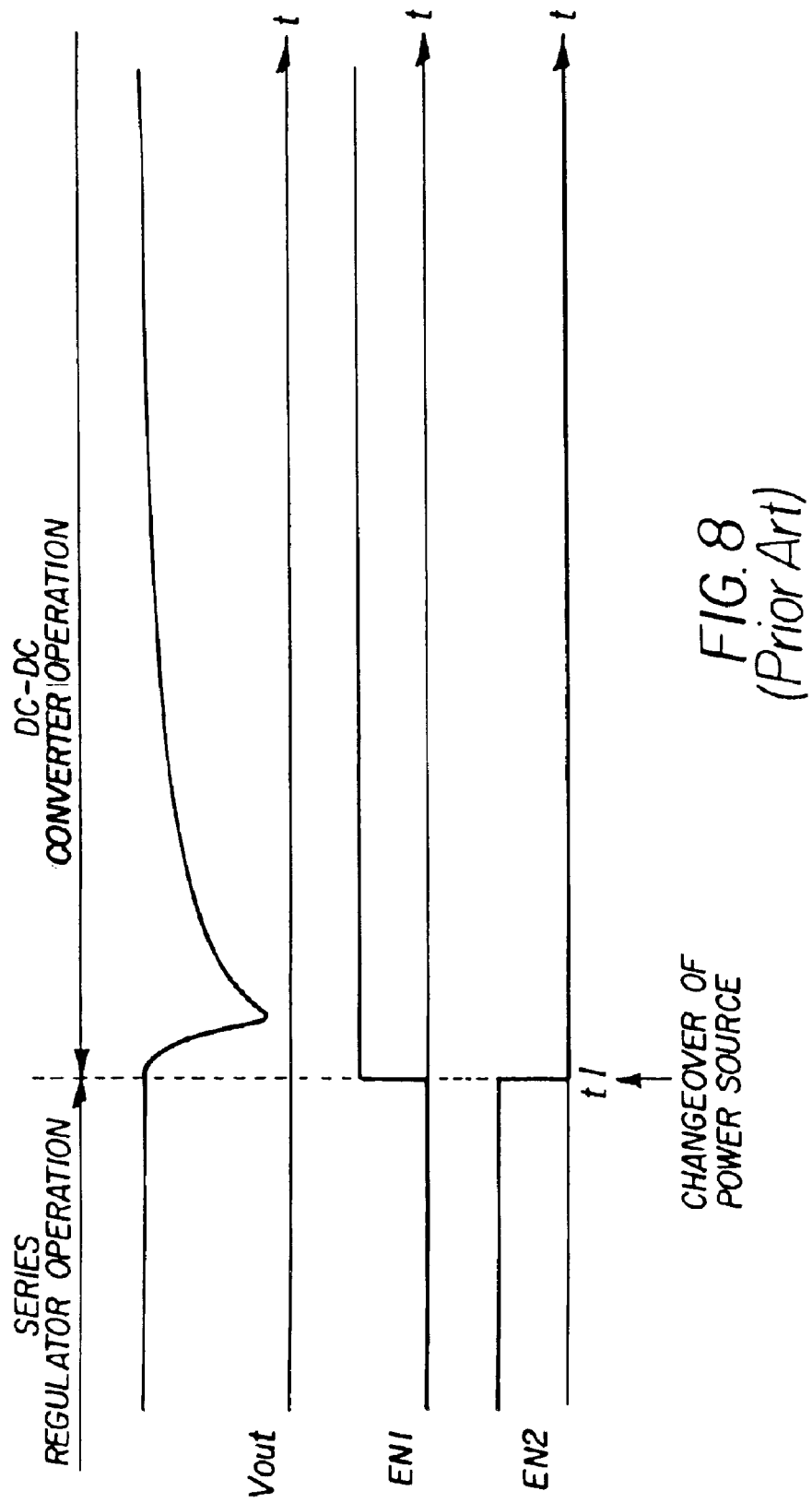
FIG. 8 is a timing chart illustrating output voltage output from a power supply system and enable signals fed to a conventional power supply system.

FIG. 5 shows a timing chart of an output voltage from the power supply system, and input signals of enable signals and a step signal fed to the power supply system. When the loading on the load 30 is light, the enable signal EN1 is not fed to the DC-DC converter 10, that is, in an 'L' state, and thus, the DC-DC converter 10 does not work. Enable signal EN2 is fed to the series regulator 20, that is, in an 'H' state, and thus, the series regulator 20 is working. The series regulator 20 steps down the input voltage Vin and supplies the load with an output voltage Vout. When the loading on the load 30 changes from light to heavy, the enable signal EN1 shifts to an 'H' state and the enable signal EN2 shifts to an 'L' state. Consequently, the series regulator 20 ceases to work. The PWM control circuit 11 of the DC-DC converter 10 outputs switching signal OUT1 for switching ON and OFF the transistor Q1 upon receipt of the enable signal EN1. The PWM control circuit 11 receives the step signal SR with gradually increasing periods in the 'H' state and outputs the switching signal OUT2 in response to this step signal SR to gradually increase the number of turn-ONs of the transistor Q2.

Consequently, the number of connection or average time period in which the load 30 is connected to the ground gradually increases after changeover of the power source from the series regulator 20 to the DC-DC converter 10. Therefore, backflow of electric current from the capacitor C2 through the inductor L2 and the transistor Q2 is suppressed after the transition of the power source. Thus, drop of the output voltage Vout supplied to the load 30 is suppressed as shown in FIG. 5. When a series regulator operates during a waiting period and a DC-DC converter operates during a normally working period in an electronic apparatus, a malfunctioning, for example unintentional resetting, that might occur due to voltage drop during the power source changeover can also be avoided.

Although in the above-described embodiment both transistors Q1 and Q2 are N-channel MOS transistors, the only requirement of these transistors is transferring the input voltage Vin to the load and connecting the load 30 to the ground repeatedly alternately. Accordingly, the transistors Q1 and Q2 can be both P-channel MOS transistors, or one P-channel MOS transistor and one N-channel MOS transistor.

The operation of the power supply system is explained in terms of ON-period duty cycle of the DC-DC converter 10 after changeover from the series regulator 20 to the DC-DC converter 10. When loading on the load 30 is heavy, which means that the output current needs to be large as long as the output voltage Vout does not decrease, the current flowing in the inductor L2 is continuous during the transistor Q2 in the DC-DC converter 10 is continuously in the OFF state, that is, the DC-DC converter 10 is in a continuous current mode. In this case, an ON-period duty cycle of the DC-DC converter is represented by the equation (2) below, which is identical to equation (1).

$$D = Vout/Vin \quad (2)$$

When the loading on the load 30 is light and the power source is changed over from the series regulator 20 to the DC-DC converter 10, the current flowing in the inductor L2 is intermittent when the transistor Q2 in the DC-DC converter 10 is continuously in the OFF-state; that is, the DC-DC converter 10 is in a discontinuous current mode. An on-period duty cycle of the DC-DC converter in this case is represented by the following equation (3).

$$D = \sqrt{\frac{2fLVoutIout}{Vin(Vin - Vout)}} \quad (3)$$

where f=1/(T$_{ON}$+T$_{OFF}$) and is a switching frequency of the transistor Q1.

The equation (3) is derived as follows. When the transistor Q1 turns ON in the discontinuous current mode, electric current flowing into the power supply system is (Vin−Vout) t/L, where t is time and L is inductance of the inductor L2. Consequently, the electric power P$_{ON}$ supplied to the output terminal from the input terminal of the power supply system is represented by the following equation (4).

$$P_{ON} = Vin\,(Vin-Vout)t/L \quad (4)$$

Integrating equation (4) from 0 to T$_{ON}$ and averaging over one period, average power Pav is represented by the following equation (5).

$$Pav = \frac{1}{T_{ON} + T_{OFF}} \int_0^{T_{ON}} \frac{Vin(Vin - Vout)}{L} t\,dt \quad (5)$$

$$= \frac{Vin(Vin - Vout)T_{ON}^2}{2L(T_{ON} + T_{OFF})}$$

where T$_{ON}$ and T$_{OFF}$ are ON- and OFF-periods of the transistor Q1.

The power Pav of equation (5) equals to output power Po of the power supply system. The output power Po is represented by the following equation (6) using output current Iout and output voltage Vout.

$$Po = Iout\,Vout \quad (6)$$

Since the equations (5) and (6) represent the same quantity, the equation (3) can be derived from the following equations (7a) and (7b).

$$\frac{Vin(Vin - Vout)T_{ON}^2}{2L(T_{ON} + T_{OFF})} = IoutVout \quad (7a)$$

$$D^2 = \left(\frac{T_{ON}}{T_{ON} + T_{OFF}}\right)^2 = \frac{1}{T_{ON} + T_{OFF}} \cdot \frac{2LVoutIout}{Vin(Vin - Vout)}$$

$$= f \cdot \frac{2LVoutIout}{Vin(Vin - Vout)} \quad (7b)$$

When the transistor Q2 is switched from OFF to ON without gradually increasing the number of turn-ONs of the transistor Q2, ON-period duty cycle in the continuous current mode does not change and the output voltage Vout is constant. In the discontinuous current mode, a period occurs in which the ON-period of the transistor Q2 is excessively long due to the delay of control of the PWM control circuit 11 in the process of transition from the ON-period duty cycle represented by equation (3) to the ON-period duty cycle represented by equation (2). As a result, the output voltage Vout drops significantly. However, the drop of the output voltage Vout can be suppressed by gradually increasing the number of turn-ONs, and consequently the duration of ON-period, of the transistor Q2 according to the step signal SR.

As described so far, since the number of turn-ONs or average time interval of ON-period of the second switching element that connects the load to the ground gradually increases in the power supply system according to the present invention, the backward current can be suppressed from flowing through the second switching element to the ground, when the power source is changed over from a series regulator to a DC-DC converter. Therefore, the drop of output voltage is restrained in the event of changeover of the power source.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2002-267988, in its entirety, including the drawings, claims, and the specification thereof, is incorporated herein by reference.

What is claimed is:

1. A power supply system for outputting a voltage to a load by changing power sources, the power supply system comprising:

a DC-DC converter having a first switching element that transfers input voltage to the load, a second switching element that connects the load to a ground, and a control circuit that turns ON and OFF the first switching element and the second switching element with a first selection signal without overlapping ON-periods of the first switching element and the second switching element, wherein the second switching element turns ON m times in a stepping period during which the first switching element turns ON n times, wherein n is a predetermined integer, and m is an integer between any of zero and n that increases in the every stepping period; and a series regulator that outputs a voltage to the load stepping-down the input voltage with a second selection signal.

2. A power supply system according to claim 1, wherein the control circuit receives step signals with gradually increasing pulse widths and gradually increases the number m of turn-ON of the second switching element in each of the stepping periods.

3. A power supply system according to claim 2, wherein the pulse width increases in the every stepping period by a specified increment step.

4. A power supply system according to claim 1, wherein the first selection signal is fed to the DC-DC converter and the second selection signal is fed to the series regulator corresponding to a loading condition of the load.

5. A power supply system according to claim 1, wherein the first selection signal and the second selection signal are mutually exclusive so that the first and second selection signals are not simultaneously fed to the control circuit.

6. A method of controlling a power supply system for outputting a voltage to a load by changing power sources, the power supply system a DC-DC converter having a first switching element that transfers input voltage to the load, a second switching element that connects the load to a ground, and a control circuit that turns ON and OFF the first and second switching elements with a first selection signal, and a series regulator that outputs a voltage to the load with a second selection signal, the method comprising the steps of:

outputting a voltage to the load by inputting the first signal to the control circuit of the DC-DC converter to turn ON and OFF the first and second switching elements without overlapping ON-periods of the first and second switching elements, and turning ON the second switching element m times in a stepping period during which the first switching element turns ON n times, wherein n is a predetermined integer, and m is an integer between any of zero and n that increases in every stepping period; and outputting a voltage to the load by inputting the second selection signal to the series regulator.

* * * * *